United States Patent
Wendel et al.

(10) Patent No.: US 11,217,038 B2
(45) Date of Patent: Jan. 4, 2022

(54) SYSTEM AND METHOD FOR DETECTION OF DEVIATIONS IN PACKAGING CONTAINERS

(71) Applicant: Tetra Laval Holdings & Finance S.A., Pully (CH)

(72) Inventors: Johan Wendel, Genarp (SE); Andreas Åberg, Malmö (SE); Peter Johannesson, Malmö (SE); Erik Bergvall, Eslöv (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 17/256,342

(22) PCT Filed: Jun. 18, 2019

(86) PCT No.: PCT/EP2019/066067
§ 371 (c)(1),
(2) Date: Dec. 28, 2020

(87) PCT Pub. No.: WO2020/002057
PCT Pub. Date: Jan. 2, 2020

(65) Prior Publication Data
US 2021/0248838 A1 Aug. 12, 2021

(30) Foreign Application Priority Data
Jun. 28, 2018 (EP) .................................. 18180305

(51) Int. Cl.
*G06T 19/20* (2011.01)
(52) U.S. Cl.
CPC ...... *G06T 19/20* (2013.01); *G06T 2219/2021* (2013.01)
(58) Field of Classification Search
CPC .................. G06T 19/20; G06T 2219/2021
See application file for complete search history.

(56) References Cited

U.S. PATENT DOCUMENTS

2011/0172972 A1* 7/2011 Gudmundson ........ G01N 23/10
 703/1
2018/0286069 A1* 10/2018 Takahashi ............... G06T 19/20

FOREIGN PATENT DOCUMENTS

EP 3396632 10/2018
WO WO 2017/109918 6/2017

OTHER PUBLICATIONS

Yuhuan Liu, Shengyong Chen, Tinglong Tang and Meng Zhao, "Defect Inspection of Medicine Vials Using LBP Features and SVM Classifier," IEEE Xplore, Jul. 20, 2017. https://ieeexplore.ieee.org/stamp/stamp.jsp?tp=&arnumber=7984515 (Year: 2017).*

(Continued)

*Primary Examiner* — Sing-Wai Wu
(74) *Attorney, Agent, or Firm* — Knobbe, Martens, Olson & Bear LLP

(57) ABSTRACT

A method for detection of deviations in packaging containers is disclosed, comprising creating a virtual model of a packaging container in a virtual coordinate system (x, y, z), defining a deformation zone on a surface of the virtual model, creating a defined deviation in the deformation zone having a defined geometry and coordinates in the virtual coordinate system (x, y, z) to create a controlled deformation of the virtual model, producing an image rendering of the virtual model with said controlled deformation to generate image features representing a deviation in the packaging container, associating the image features with different categories of deviations, and inputting the image features to a machine learning-based model for subsequent detection of categories of deviations in packaging containers in a packaging machine based on the image features. A system for detection of deviations is also disclosed.

20 Claims, 8 Drawing Sheets

(56) References Cited

OTHER PUBLICATIONS

Extended European Search Report issued in Application No. 19180966.4 dated Jan. 8, 2021.
Communication under Rule 71(3) EPC issued in Application No. 19180966.4 dated Jan. 12, 2021.
Su, et al., Render for CNN: Viewpoint Estimation in Images Using CNNs Trained with Rendered 3D Model Views, 2015 IEEE International Conference on Computer Vision (ICCV) 2686-2694 (2015).
International Search Report and Written Opinion issued in Application No. PCT/EP2019/066067 dated Sep. 30, 2019.

* cited by examiner

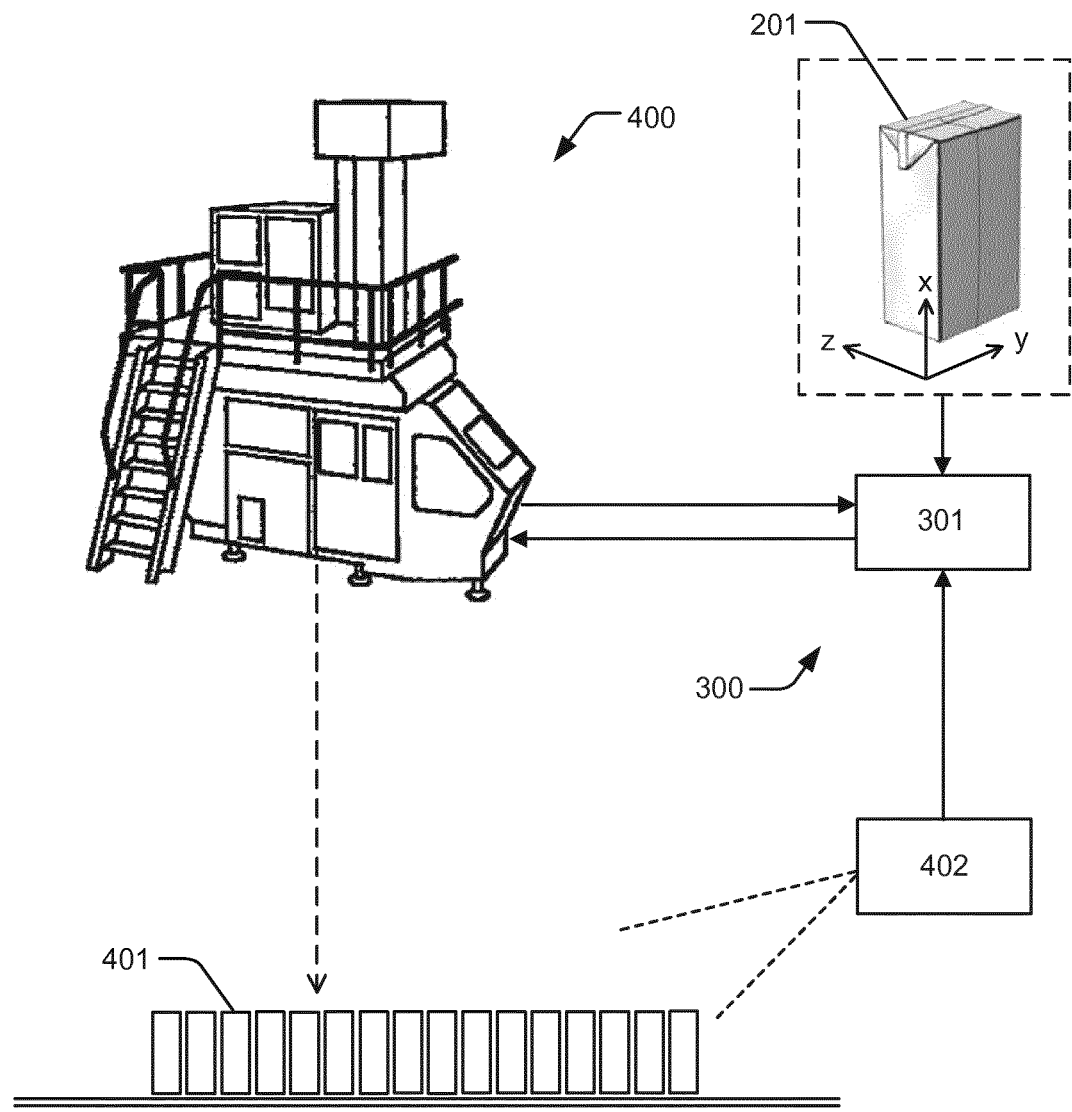
Fig. 1a
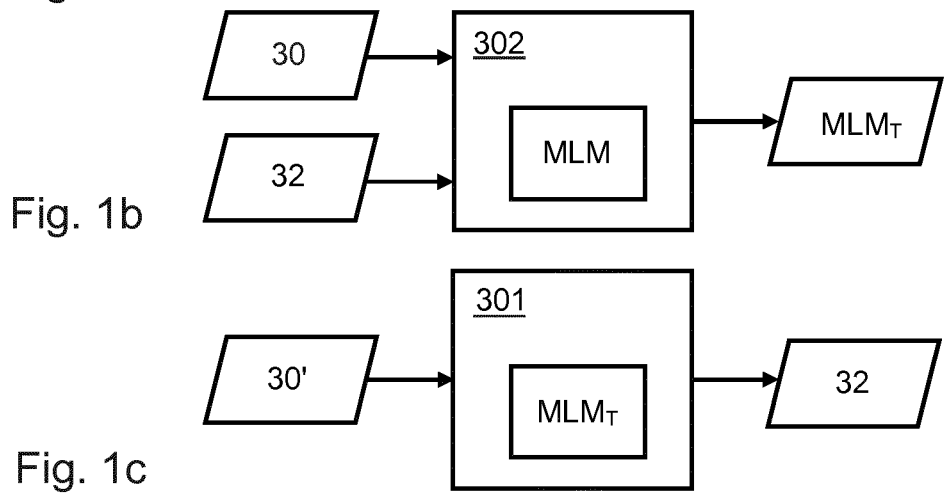
Fig. 1b
Fig. 1c

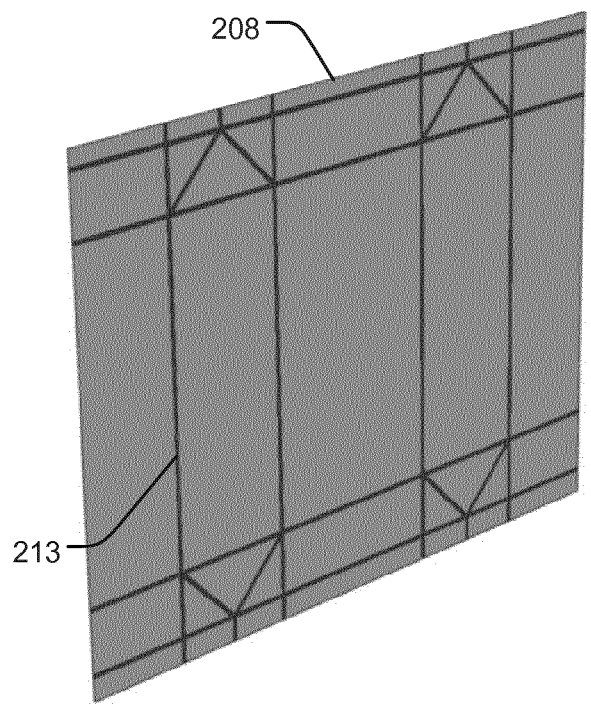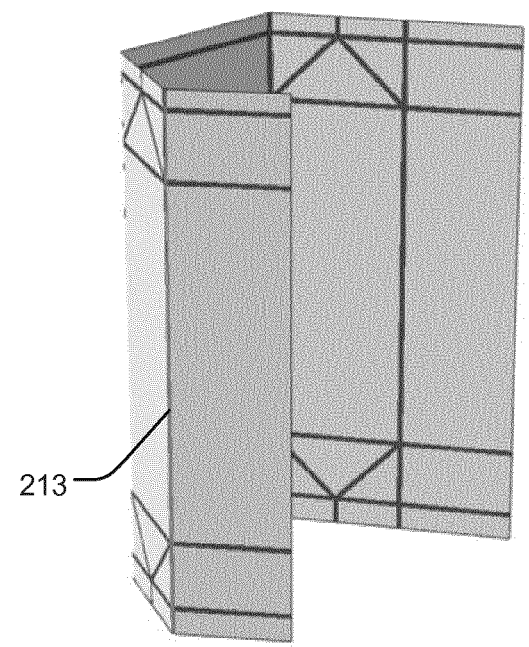
Fig. 5a  Fig. 5b
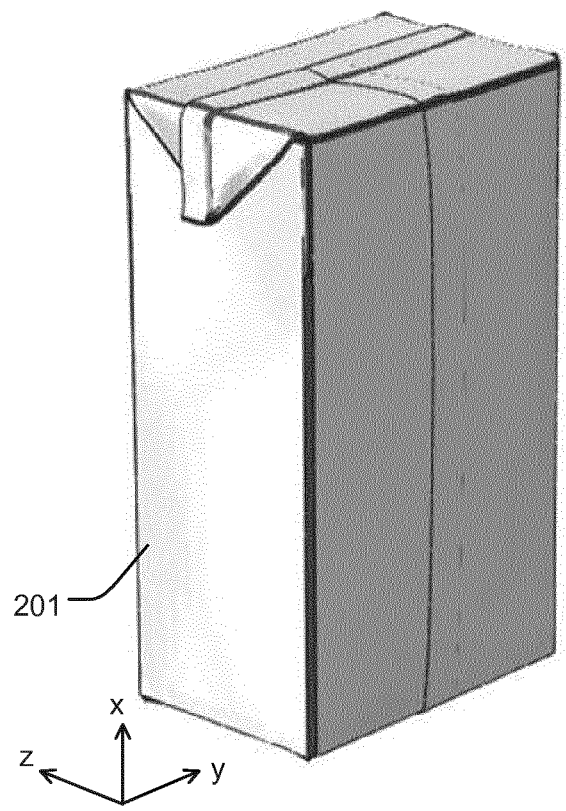
Fig. 5c

SYSTEM AND METHOD FOR DETECTION OF DEVIATIONS IN PACKAGING CONTAINERS

TECHNICAL FIELD

The present invention relates to a method for detection of deviations in packaging containers, a related computer program product, and a system for detection of deviations in packaging containers.

BACKGROUND

Detection of deviations, such as defects or other deviations from an expected product configuration is critical in production lines, such as in the manufacturing of sealed packaging containers for liquid- or semi liquid food in a filling machine or related systems for production of such packaging containers, in order to configure optimal operating settings and ensuring a desired performance over a period of time. Deviations in the produced packaging containers may lead to variations in the appearance of the packaging containers, i.e. inconsistencies that may cause concern from the consumer point-of-view, or sub-optimal aseptic performance. Hence, it is desirable to develop efficient tools and procedures for identification of faulty behavior of the components in such systems that may result in various types of deviations in the produced packaging containers. Since the latest generations of filling machines or related apparatuses employed for the production of sealed packaging containers operate at very high speeds to further increase the throughput of the production line, it has been cumbersome to accurately characterize all aspects of the performance of the package container production without disruption of the production line. This may lead to sub-optimal performance and lowered throughput. A problem is thus how to implement a reliable quality control tool and strategy with a minimum impact on the production while requiring a minimum amount of resources.

SUMMARY

It is an object of the invention to at least partly overcome one or more limitations of the prior art. In particular, it is an object to provide an improved method and system for detection of deviations in packaging containers for liquid food, and in particular allowing for avoiding one or more of the above-mentioned problems and compromises, including providing for a facilitated and more efficient identification of different categories of deviations in a packaging container and a related method for detection of deviations.

In a first aspect of the invention, this is achieved by a method for detection of deviations in packaging containers for liquid food produced in a machine, comprising creating a virtual model of a packaging container in a virtual coordinate system, defining a deformation zone on a surface of the virtual model, creating a defined deviation in the deformation zone having a defined geometry and coordinates in the virtual coordinate system to create a controlled deformation of the virtual model, producing an image rendering of the virtual model with said controlled deformation to generate image features representing a deviation in the packaging container, associating the image features with different categories of deviations, and inputting the image features to a machine learning-based model for subsequent detection of categories of deviations in packaging containers in the machine based on the image features.

In a second aspect of the invention, this is achieved by a system for detection of deviations in packaging containers for liquid food produced in a machine, comprising a processing unit configured to create a virtual model of a packaging container in a virtual coordinate system, define a deformation zone on a surface of the virtual model, create a defined deviation in the deformation zone having a defined geometry and coordinates in the virtual coordinate system to create a controlled deformation of the virtual model, produce an image rendering of the virtual model with the controlled deformation to generate image features representing a deviation in the packaging container, associate the image features with different categories of deviations, and input the image features to a machine learning-based model for subsequent detection of categories of deviations in packaging containers in the machine based on the image features.

In a third aspect of the invention, this is achieved by a computer program product comprising instructions which, when the program is executed by a computer, cause the computer to carry out the steps of the method according to the first aspect.

Further examples of the invention are defined in the dependent claims, wherein features for the first aspect may be implemented for the second and subsequent aspects, and vice versa.

By creating a controlled deformation of a virtual model of a packaging container, producing an image rendering of the virtual model with such controlled deformation to generate image features representing a deviation in the packaging container, associating the image features with different categories of deviations, and inputting the image features to a machine learning-based model for subsequent detection of categories of deviations in packaging containers in a packaging machine based on the image features, a wider range of types of deviations may be accurately identified without disrupting the production line. The controlled deformations and the virtually generated image features thereof enables improved recognition of various types of deviations by virtually tailoring the training of a machine learning-based model while there is no need to disrupt the production.

Still other objectives, features, aspects and advantages of the invention will appear from the following detailed description as well as from the drawings.

DRAWINGS

Embodiments of the invention will now be described, by way of example, with reference to the accompanying schematic drawings.

FIG. 1a is a schematic illustration of a system for detection of deviations in packaging containers;

FIG. 1b shows an example of training of a machine learning-based model;

FIG. 1c shows an example of using a trained machine learning-based model.

Figure 6A:
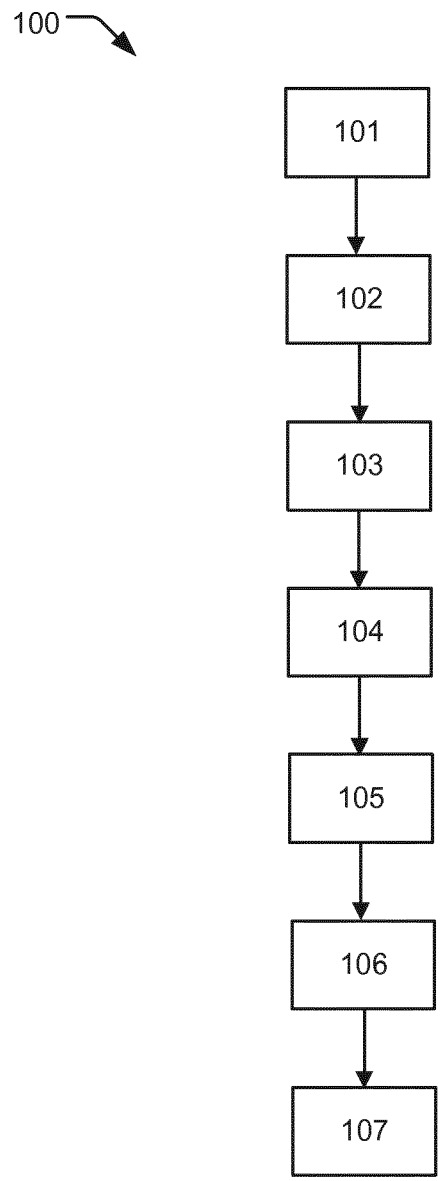
Figure 6B:
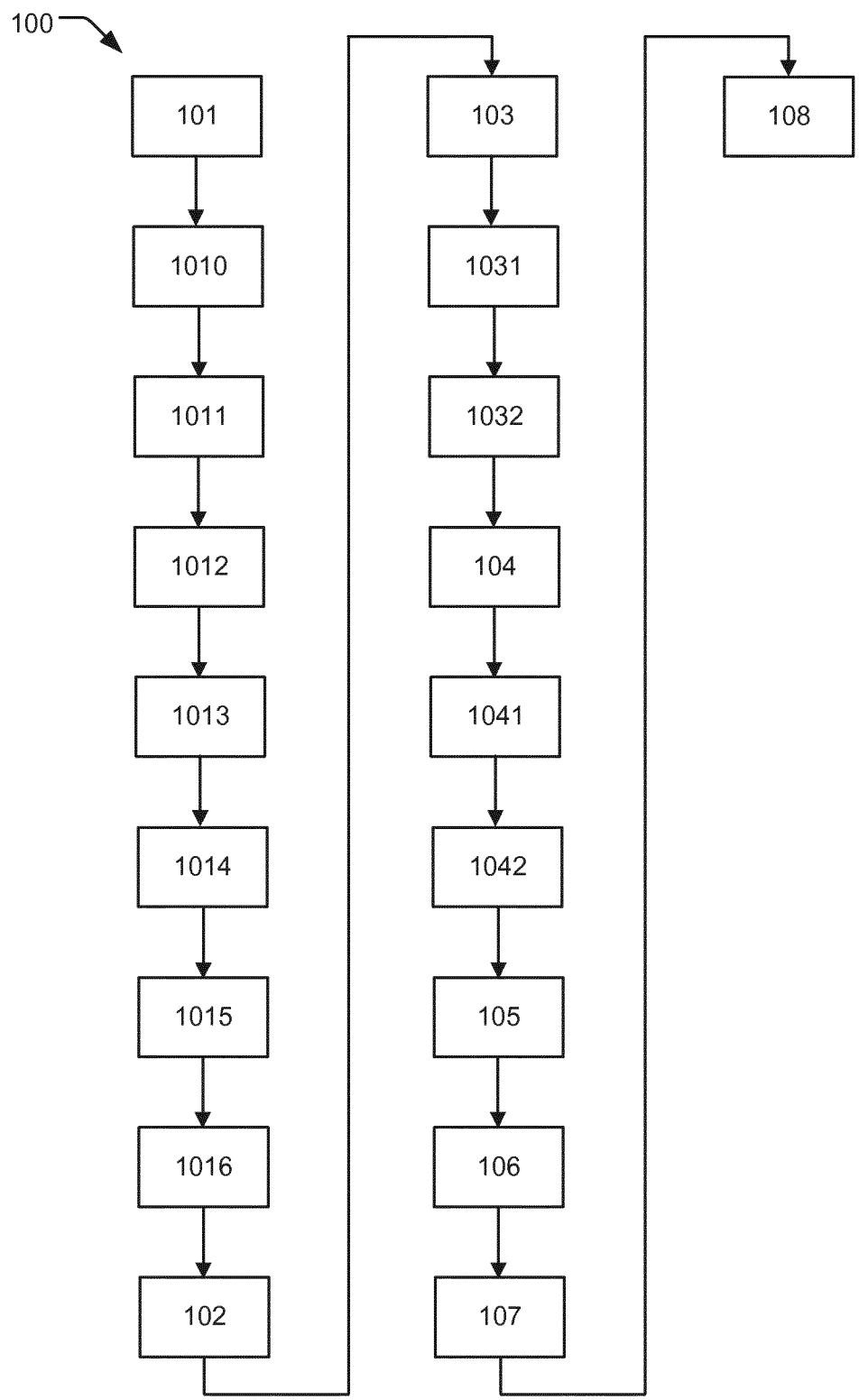

FIGS. 5a-c are schematic illustrations showing a virtual modelling of a packaging container;

FIG. 6a is a flowchart of a method of detection of deviations in packaging containers; and FIG. 6b is a further flowchart of a method for detection of deviations in packaging containers.

DETAILED DESCRIPTION

Embodiments of the invention will now be described more fully hereinafter with reference to the accompanying drawings, in which some, but not all, embodiments of the invention are shown. The invention may be embodied in many different forms and should not be construed as limited to the embodiments set forth herein.

As used herein, "liquid food" refers to any food product that is non-solid, semi-liquid or pourable at room temperature, including beverages, such as fruit juices, wines, beers, sodas, as well as dairy products, sauces, oils, creams, custards, soups, etc, and also solid food products in a liquid, such as beans, fruits, tomatoes, stews, etc.

Figure 2A:
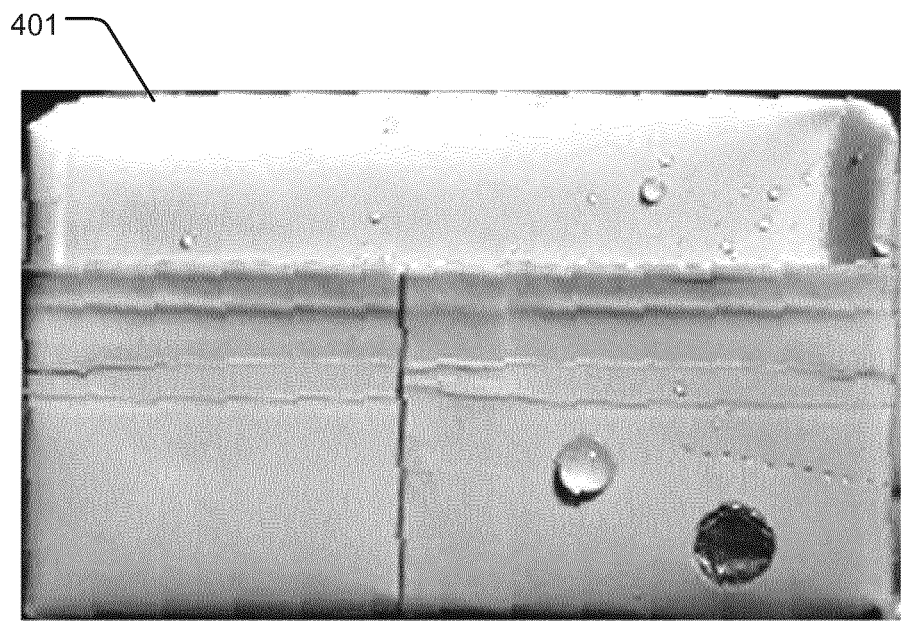
FIG. 2a is a top-down view of a packaging container having a deviation in the top-right corner.
Figure 2B:
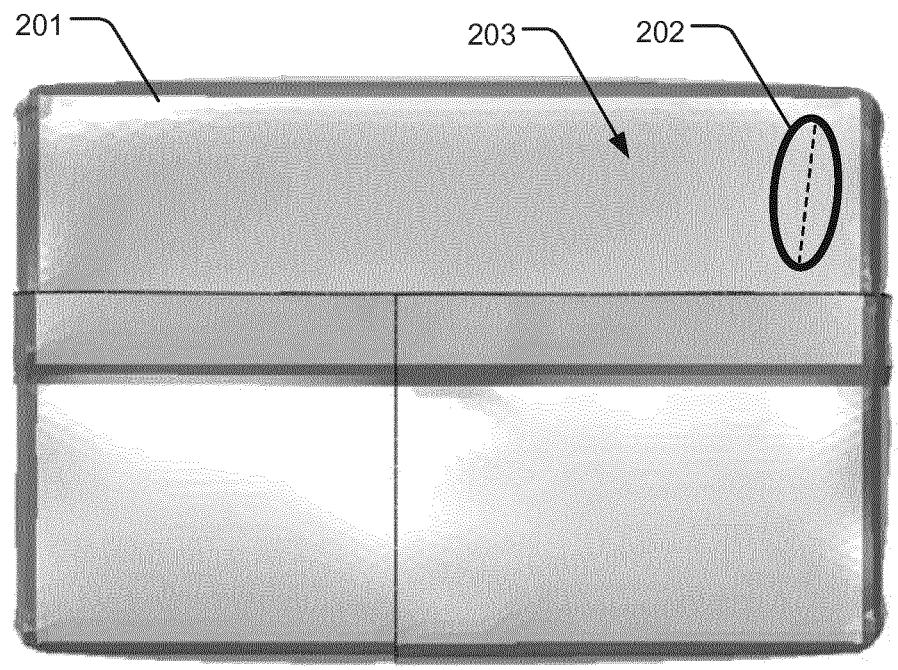
FIG. 2b is a top-down view of a virtual model of a packaging container with a deformation zone in the top-right corner.
Figure 2C:
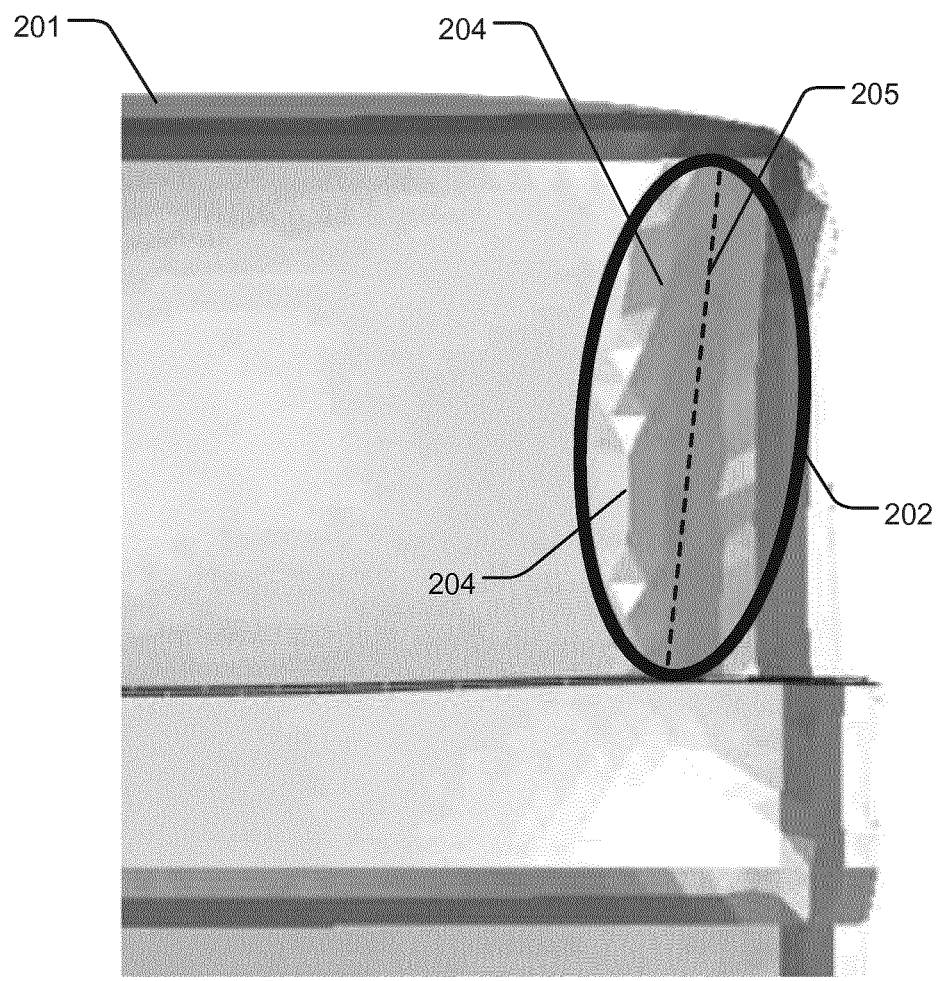
FIG. 2c is an enlarged view of the virtual model of the packaging container having a controlled deformation in the deformation zone indicated in FIG. 2b.
Figure 3:
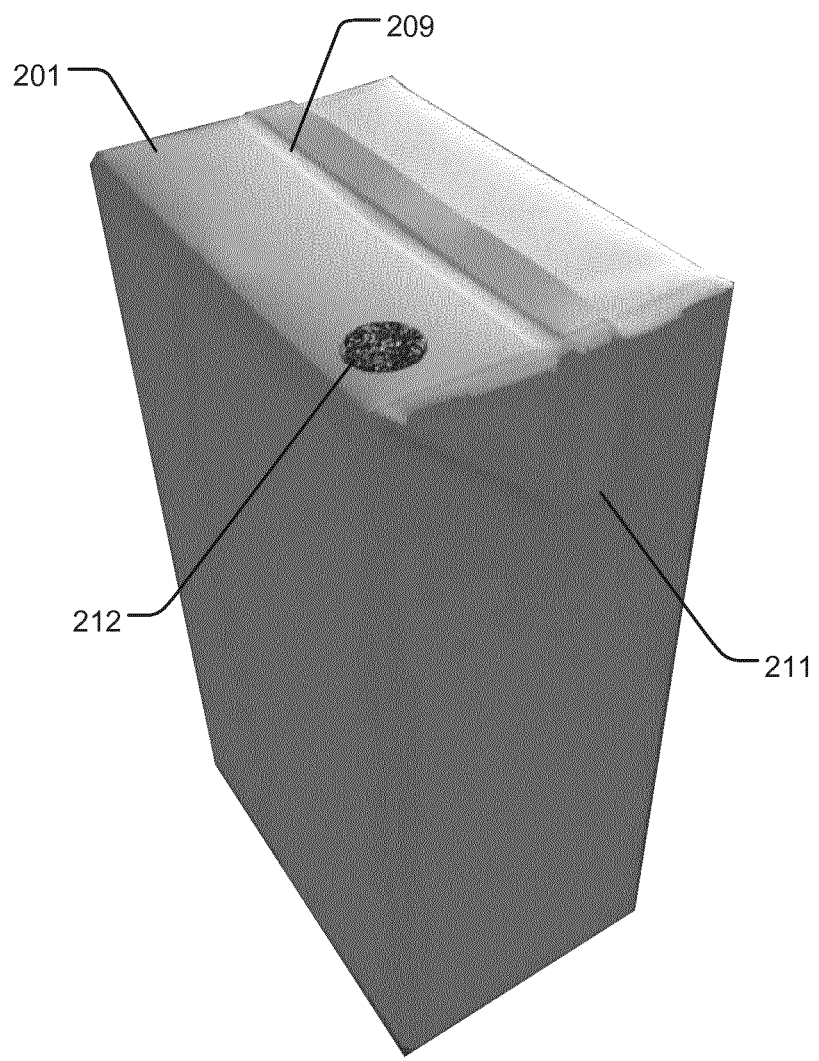
FIG. 3 is a perspective view of a virtual model of a packaging container.

FIG. 1a is a schematic illustration of a system 300 for detection of deviations in packaging containers 401 for liquid food produced in a machine 400 such as in a filling machine 400 sealing the food inside the packaging containers 401, or another packaging machine. The system 300 comprises a processing unit 301 configured to create a virtual model 201 of a packaging container 401 in a virtual coordinate system (x, y, z), and define a deformation zone 202 on a surface 203 of the virtual model, as schematically illustrated in FIG. 2b which is a top-down view of such virtual model 201 of a packaging container 401. FIG. 2a is corresponding top-down view of a packaging container 401 having a deviation in the top-right corner. FIG. 3 is a perspective view of a virtual model 201 of a packaging container 401. The processing unit 301 is configured to create a defined deviation 204 in the deformation zone 202 having a defined geometry and coordinates in the virtual coordinate system to create a controlled deformation of the virtual model 201. FIG. 2c is an enlarged view of the virtual model 201 of the packaging container 401 having a controlled deformation in the deformation zone 202. The deformation zone 202 may be placed at any part of the surface 203 of the virtual model 201 and the defined deviation 204 may have various geometries. The processing unit 301 is configured to produce an image rendering of the virtual model 201 with the controlled deformation to generate image features representing a deviation in the packaging container 401.

As used herein, an "image rendering" is a photorealistic or non-photorealistic image which is produced to represent the virtual model 201, or part thereof. The image rendering may be produced to account for the position of an imaging device 402 in relation to the machine 400 (FIG. 1a), the lighting conditions at the machine 400, the surface structure of the material in the packaging containers 401, coloring and/or patterning of the packaging containers 401, etc. The image rendering may be produced by conventional ray casting or ray tracing, as well as rendering techniques that also account for diffraction, e.g. wave optics, GTD algorithms (Geometrical Theory of Diffraction), PTD algorithms (Physical Theory of Diffraction), Physical Optics (PO), Boundary Element Method (BEM), etc.

As used herein, the term "deformation" is intended to generally designate any distortion of or deviation from an acceptable or ideal appearance of the packaging containers 401. Thus, a deformation is not restricted to alterations of form or shape but also includes alterations in surface structure, surface patterning, surface coloring, etc.

As understood from the foregoing, the image rendering is produced to include one or more image features that represent deviations in the packaging containers 401. For example, if a defined deviation 204 such as a wrinkle or dent is created in the deformation zone 202, the image rendering thereof includes an associated image feature such as a shadow in the deformation zone 202 at the position of such wrinkle or dent. Different types or categories of defined deviations 204 may be generated on the surface 203 of the virtual model 201 that typically result in different characterizing image features. It is thus possible to define such image features and further have the processing unit 301 configured to associate these image features with different categories of deviations. For example, the image features representing the deviations may be uniquely characterized by variations in the image features such as contrast etc, as well as from the geometry, dimensions and position of the deviations, to create a "finger print" for the different categories of deviations. A deviation should be construed as a variation from a shape, and/or a variation in material properties, and/or a color variation, or other variations of the packaging container from ideal configuration parameters which are not expected in ideal circumstances. A deviation may not be adverse for the expected function of the packaging container, but may cause inconsistencies such as in the appearance of the packaging container, which may be sub-optimal from a consumer point of view. A deviation may be a defect in the packaging container, e.g. a wrinkle or dent as mentioned above.

As understood from the foregoing, the different categories of a deviation may designate the type or class of the deviation, e.g. in terms of position, dimensions, geometry, material property, color, etc, and/or include a grading or ranking of the deviation, e.g. in terms of the magnitude (severity) of the deviation for the appearance and/or function of the packaging container 401. The grading may include any number of grades or levels. In one non-limiting example, the grading is binary and may designate the packaging container as being either acceptable or non-acceptable.

The processing unit 301 is configured to train a machine learning-based model for subsequent detection of categories of deviations in packaging containers 401 in a packaging machine 400 based on the image features. A structure for training is schematically depicted in FIG. 1b, in which the machine learning-based model MLM is loaded into a training device 302, which may be part of the processing unit 301 or a separate processing unit. In the training, image features 30 are input to the training device 302, e.g. in the form of image renderings, together with the associated categories 32. The model MLM operates on a large number of pairs of image renderings 30 and categories 32 to set its model parameters accordingly. The training results in a trained machine learning-based model, designated by $MLM_T$. The trained model $MLM_T$ may then be installed in the processing unit 301 and operated to output one or more current categories 32 based on current incoming image data 30' captured by the imaging device 402, e.g. as depicted in FIG. 1c.

Thus, the machine learning-based model utilizes the defined image features of the deviations obtained in the image rendering and provide for subsequent recognition of such deviations when image data is captured of the real packaging containers 401 in the production line, e.g. by the imaging device 402 as illustrated in FIG. 1a. By creating a controlled deformation of a virtual model 201 of a packaging container 401, producing an image rendering of the virtual model 201 with such controlled deformation to generate image features representing a deviation in the packaging container 401, associating the image features with different categories of deviations, and inputting the image features to a machine learning-based model for subsequent detection of categories of deviations in packaging containers 401 in a packaging machine 400 based on the image features, a wider range of types of deviations may be accurately identified without disrupting the production line. The controlled deformations and the virtually generated image features thereof enables improved recognition of various types of deviations by virtually tailoring the training of a machine learning-based model while there is no need to disrupt the production or detect/generate deviations in real packaging containers for this purpose. In training, the machine learning-based model may be optimized quicker and with less resources compared to cases where the image features are obtained from real image data captured in the production line. For example, in training, there is no need to spend resources on image processing to recognize e.g. the position of the deviations on the packaging containers 401 since the position of the deformation zone 202 of the virtual model 201 which is used as input to the machine learning-based model is already defined. The demand for computational resources may thus be alleviated, which is especially valuable in high-speed production lines. Since all parameters that are utilized to generate the defined deviation 204, e.g. the amount of deformation or displacement of the surface 203, are readily customizable it is possible to optimize the input to the machine learning-based model for the training and produce a wider range of controlled deformations, than would be impossible with real packaging containers 401.

The trained machine learning-based model may be accessed by the processing unit 301 by being implemented locally in the system 300, or by having the processing unit 301 configured to access the machine learning-based model remotely on a server. It is further conceivable that the processing unit 301 itself may be implemented at a server at a remote location and being configured to communicate with an imaging device 402 and the machine 400 from the remote server. Any suitable machine learning-based model known in the art may be used, including but not limited to an artificial neural network (ANN), a convolutional neural network (CNN) and a support vector machine (SVM), or any combination thereof. In one embodiment, the machine learning-based model incorporates a deep-learning based model.

In the subsequent detection of categories of deviations in the packaging containers 401 it is conceivable that the processing unit 301 is configured to correlate the occurrence and category of the deviations with the production parameters, e.g. by communicating with a machine controller of the machine 400. It is thus possible to accurately characterize the origin and circumstances of the formation of any deviations in the packaging containers 401. This allows facilitated optimization of the production line and provides for a reliable tool for detection of deviations. At the same time, by having a system 300 configured as described above, the impact on the throughput of the production line is minimized. A facilitated identification of different categories of deviations in a packaging container 401 is provided, while requiring a minimized demand on resources for the process monitoring. Besides from the facilitated and less time-consuming identification of faulty components and functionalities in the machine 400, the system 300 provides for ensuring a further increased quality of the produced packaging containers 401.

For the subsequent detection 107 of categories of deviations in packaging containers 401 the imaging device 402 may be arranged to capture image data of the packaging containers 401 when transported along a conveyor, after being sealed in the filling machine 400. It is conceivable that the imaging device 402 may be arranged along any part of the production line, to capture image data of the packaging containers 401 when at a desired part of the production process. It is also conceivable that a plurality of imaging devices 402 may be arranged to capture the image data from different parts of the production line and/or from different angles in relation to the packaging containers 401, and/or with different exposure settings or image processing parameters. The image data may thus comprise multiple streams of image data captured from such plurality of imaging devices 402. The person skilled in the art realizes that the machine learning-based model, and the training thereof, are modified accordingly to account for the multiple streams of image data.

The flowchart of FIG. 6a, in conjunction with FIGS. 1-5, discloses a related method 100 for detection of deviations in packaging containers 401 for liquid food produced in a machine 400. The method 100 comprises creating 101 a virtual model 201 of a packaging container 401 in a virtual coordinate system (x, y, z), defining 102 a deformation zone 202 on a surface 203 of the virtual model, creating 103 a defined deviation 204 in the deformation zone 202 having a defined geometry and coordinates in the virtual coordinate system to create a controlled deformation of the virtual model 201, producing 104 an image rendering of the virtual model 201 with the controlled deformation to generate image features representing a deviation in the packaging container, associating 105 the image features with different categories of deviations, and inputting 106 the image features to a machine learning-based model for training and use in subsequent detection 107 of categories of deviations in packaging containers 401 in a packaging machine 400 based on the image features, e.g. represented in image data taken by the imaging device(s) 402 (cf. FIG. 1c). The method 100 thus provides for the advantageous benefits as described above in relation to the system 300, in particular allowing for a facilitated and more efficient identification of different categories of deviations in packaging containers with a minimum of impact on the production line.

The defined deviation 204 may be defined as a concave shape in the surface 203 of the virtual model 201. Alternatively, or in addition, the defined deviation 204 may be defined as a convex shape in the surface 203 of the virtual model 201. Furthermore, the defined deviations 204 may comprise any of; wrinkles in the surface 203 of the virtual model 201, unsealed flaps 211 as well as torn or cloudy pre-punched holes 212 generated in the virtual model 201 (see FIG. 3), or delamination in opening areas. Each of the deviations may be associated with unique image features in the image rendering. For example, the image features representing the deviations may be uniquely characterized by variations in the image rendering such as color, exposure, contrast etc, as well as from the geometry, dimensions and position of the deviations, to create a "finger print" for each of the different deviations that may be subsequently detected on the packaging containers 401.

FIG. 6b is a further flowchart of a method 100 for detection of deviations in packaging containers 401. The method 100 may comprise defining 1031 coordinates of a deformation line 205 extending along the surface 203 of the virtual model 201, and folding 1032 the surface 203 along the deformation line 205 with a defined angle to form the concave and/or convex shape in the surface 203. FIG. 2c shows an example where the surface 204 has been folded or displaced along the deformation line 205 to form a convex shape to the left of the deformation line 205. Various surface deformations may thus be generated in a facilitated manner with a controlled set of parameters.

The method 100 may comprise mapping 1013 a décor of defined color and/or pattern on the surface 203 of the virtual model 201. Mapping the surface 203 with different decors provides for a more accurate representation of actual packaging containers 401 in the virtual model 201 and enhancing of the machine-based learning. The processing unit 301 may thus be configured to map a décor of defined color and/or pattern on the surface 203 of the virtual model 201.

Producing the image rendering may comprise processing 1041 the virtual model 201 according to defined lighting conditions. This further provides for enhancing the machine-based learning since the lighting conditions may affect e.g. the color of the perceived image features representing the defined deviations 204. Different lighting conditions may be used in combination with the mapping of a décor of defined color and/or pattern on the surface 203 of the virtual model 201.

The method 100 may comprise defining 1014 a surface roughness on the surface 203 of the virtual model 201. Surface roughness and other surface characteristics may be simulated by the virtual model 201 to take into account physical and optical effects such as the amount of reflected light from the surface 203, and thus to provide for a more accurate representation of real packaging containers 401 and a further improved detection of deviations.

Figure 4A:
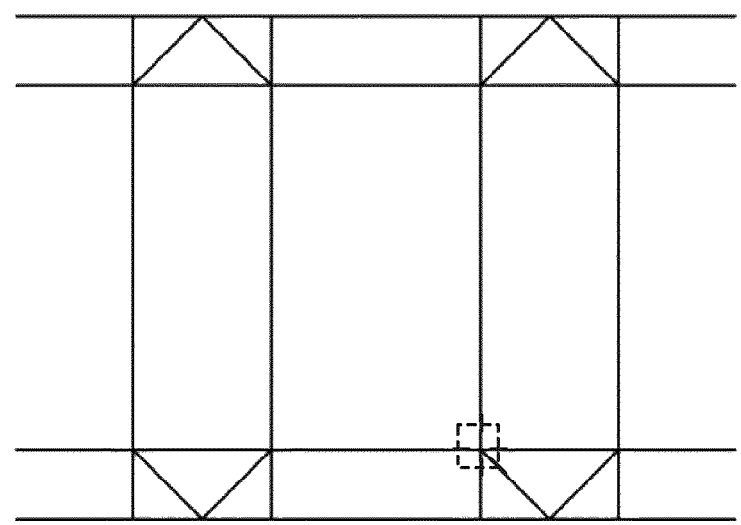
FIG. 4a show an example of a crease line pattern.
Figure 4B:
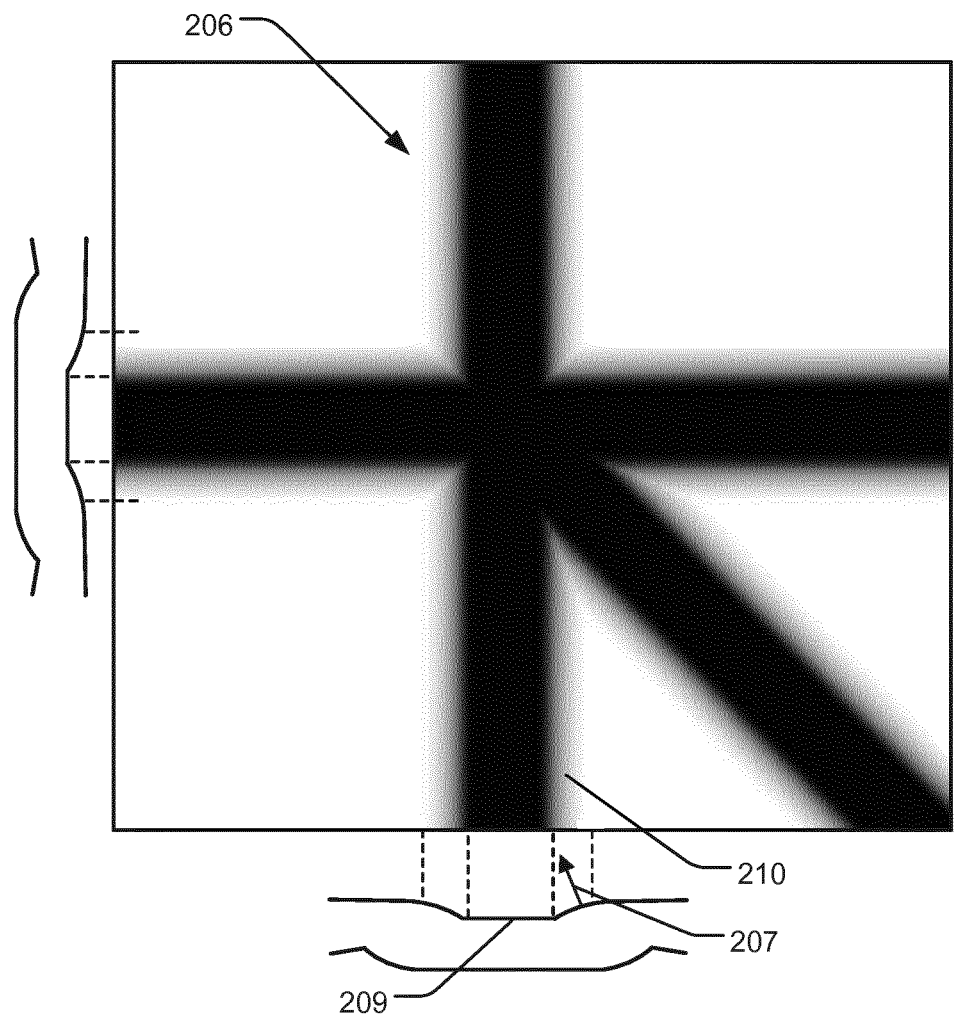
FIG. 4b is a schematic illustration of crease line generation in a virtual model of a packaging container.

The method 100 may comprise defining at three-dimensional pattern 209 on the surface 203 by mapping 1015 a two-dimensional image 206 of the pattern 209 on the surface 203. FIG. 4b shows an example of such two-dimensional image 206. The image 206 comprises image data that defines a gradient 210, e.g. by having a gradual shading between the solid black lines in the image 206 and the solid white background as illustrated in FIG. 4b. At the position on the surface 203 where the two-dimensional image of the pattern 209 has been mapped, the method 100 comprises changing 1016 the orientation of the surface 203 so that a surface normal 207 of the surface 203 is changed according to the gradient 210, i.e. the surface 203 is displaced or rotated so that the surface normal 207 follows the gradient 210. A three-dimensional pattern 209 is thus provided on the surface 203. The pattern 209 may comprise different structures on the surface 203 such as recesses or bumps. In one example, the pattern comprises at least one crease line, as illustrated in the virtual model 201 of FIG. 3. A two-dimensional image of the pattern is illustrated in FIG. 4a. It should be understood that various crease line patterns may be mapped onto the surface 203. The pattern 209 may comprise a recess that models a weakened area in the surface 203 such as a pre-punched hole 212, as illustrated in FIG. 3.

The processing unit 301 may thus be configured to define a pattern 209 on the surface 203 by mapping a two-dimensional image 206 of the pattern 209 on the surface 203, where the image 206 comprises image data that defines a gradient 210. The processing unit 301 is configured to, at the position of the pattern on the surface 203, change the orientation of the surface 203 so that a surface normal 207 of the surface 203 is changed according to the gradient 210.

Creating the virtual model 201 may comprise defining 1010 a geometry of a blank 208 for the packaging container in the virtual coordinate system, defining 1011 crease lines 213 of the blank 208, and folding 1012 the blank 208 along the crease lines 213 in the virtual coordinate system to create the virtual model 201, as schematically illustrated in FIGS. 5a-c. Other methods of generating the virtual model 201 are also conceivable such as performing a three-dimensional scanning of a packaging container 401. Although the packaging containers exemplified in the present disclosure has been shown as rectangular containers it should be understood that various other forms of packaging containers may be generated as virtual models 201, including other types of containers such as bottles etc, where deviations may occur in a production line.

The method 100 may comprise defining 1042 a virtual camera position in the virtual coordinate system in relation to the virtual model 201 so that a viewpoint from which the image features are obtained in the image rendering corresponds to a viewpoint from a camera position for the subsequent detection by the imaging device 402 in a coordinate system of the packaging machine 400. An accurate representation of real deviations may thus be obtained from the image rendering of the defined deviations 204, thus improving the machine-based learning and the accuracy of the subsequent detection of deviations in the packaging containers 401.

A computer program product is provided comprising instructions which, when the program is executed by a computer, cause the computer to carry out the steps of the method 100 as described above in relation to FIGS. 1-6.

The method 100 may comprise communicating 108 control instructions to the machine 400 comprising modified production parameters according to the occurrence and/or category of the deviations. The control instructions may thus provide feedback to the machine 400 to modify the production process in dependence on the detected deviations. For example, the machine settings may be adjusted so that the occurrence of a particular category of deviations can be minimized. Besides from modifying the production parameters depending on if a deviation has been detected or not, the processing unit 301 may be configured to modify the production parameters based on for example the size and/or position of a deviation in a particular category.

From the description above follows that, although various embodiments of the invention have been described and shown, the invention is not restricted thereto, but may also be embodied in other ways within the scope of the subject-matter defined in the following claims.

The invention claimed is:

1. A method for detection of deviations in packaging containers for liquid food produced in a machine, the method comprising:
   creating a virtual model of a packaging container in a virtual coordinate system (x, y, z),
   defining a deformation zone on a surface of the virtual model,
   creating a defined deviation in the deformation zone having a defined geometry and coordinates in the virtual coordinate system to create a controlled deformation of the virtual model, wherein the defined deviation is defined as a concave and/or convex shape in the surface of the virtual model,
   producing an image rendering of the virtual model with said controlled deformation to generate image features representing a deviation in the packaging container, associating the image features with different categories of deviations, and inputting the image features to a machine learning-based model for subsequent detection of categories of deviations in packaging containers in the machine based on the image features, the method further comprising:
defining coordinates of a deformation line extending along the surface, and
folding the surface along the deformation line with a defined angle to form the concave and/or convex shape in the surface.

2. The method according to claim 1, further comprising mapping a décor of defined color and/or pattern on the surface of the virtual model.

3. The method according to claim 1, wherein producing the image rendering comprises processing the virtual model according to defined lighting conditions.

4. The method according to claim 1, further comprising defining a surface roughness on the surface of the virtual model.

5. The method according to claim 1, comprising defining a pattern on the surface by:
mapping a two-dimensional image of the pattern on the surface, wherein the two-dimensional image comprises image data that defines a gradient, and
changing, at a position of the pattern, the orientation of the surface so that a surface normal of the surface is changed according to the gradient.

6. The method according to claim 5, wherein the pattern comprises least one crease line.

7. The method according to claim 1, wherein creating the virtual model comprises:
defining a geometry of a blank for the packaging container in the virtual coordinate system,
defining crease lines of the blank, and
folding the blank along the crease lines in the virtual coordinate system to create the virtual model.

8. The method according to claim 1, further comprising defining a virtual camera position in the virtual coordinate system in relation to the virtual model so that a viewpoint from which the image features are obtained in the image rendering corresponds to a viewpoint from a camera position for said subsequent detection in a coordinate system of the machine.

9. The method according to claim 1, further comprising detecting with the machine learning-based model one or more deviations in another packaging container being processed by the machine based on image features of the another packaging container.

10. A non-transitory storage medium storing a computer program which, when executed by a computer, causes the computer to carry out the steps of the method according to claim 1.

11. A system for deviation detection in packaging containers for liquid food produced in a machine, the system comprising:
a processing unit configured to:
create a virtual model of a packaging container in a virtual coordinate system (x, y, z),
define a deformation zone on a surface of the virtual model,
create a defined deviation in the deformation zone having a defined geometry and coordinates in the virtual coordinate system to create a controlled deformation of the virtual model,
produce an image rendering of the virtual model with the controlled deformation to generate image features representing a deviation in the packaging container,
associate the image features with different categories of deviations, and
input the image features to a machine learning-based model for subsequent detection of categories of deviations in packaging containers in the machine based on the image features,
wherein the processing unit is further configured to define a pattern on the surface by mapping a two-dimensional image of the pattern on the surface, and
wherein the image comprises image data that defines a gradient, and
wherein, at a position of the pattern, the processing unit is configured to change the orientation of the surface so that a surface normal of the surface is changed according to the gradient.

12. The system according to claim 11, wherein the processing unit is further configured to map a décor of defined color and/or pattern on the surface of the virtual model.

13. The system according to claim 11, wherein the processing unit is further configured to detect with the machine learning-based model one or more deviations in another packaging container being processed by the machine based on image features of the another packaging container.

14. A method for detection of deviations in packaging containers for liquid food produced in a machine, the method comprising:
creating a virtual model of a packaging container in a virtual coordinate system (x, y, z),
defining a deformation zone on a surface of the virtual model,
creating a defined deviation in the deformation zone having a defined geometry and coordinates in the virtual coordinate system to create a controlled deformation of the virtual model,
producing an image rendering of the virtual model with said controlled deformation to generate image features representing a deviation in the packaging container,
associating the image features with different categories of deviations, and
inputting the image features to a machine learning-based model for subsequent detection of categories of deviations in packaging containers in the machine based on the image features,
the method further comprising defining a pattern on the surface by:
mapping a two-dimensional image of the pattern on the surface, wherein the two-dimensional image comprises image data that defines a gradient, and
changing, at a position of the pattern, the orientation of the surface so that a surface normal of the surface is changed according to the gradient.

15. The method according to claim 14, wherein the pattern comprises least one crease line.

16. The method according to claim 14, further comprising mapping a décor of defined color and/or pattern on the surface of the virtual model.

17. The method according to claim 14, wherein producing the image rendering comprises processing the virtual model according to defined lighting conditions.

18. The method according to claim 14, wherein creating the virtual model comprises:
defining a geometry of a blank for the packaging container in the virtual coordinate system, defining crease lines of the blank, and folding the blank along the crease lines in the virtual coordinate system to create the virtual model.

19. The method according to claim 14, further comprising defining a virtual camera position in the virtual coordinate system in relation to the virtual model so that a viewpoint from which the image features are obtained in the image rendering corresponds to a viewpoint from a camera position for said subsequent detection in a coordinate system of the machine.

20. The method according to claim 14, further comprising detecting with the machine learning-based model one or more deviations in another packaging container being processed by the machine based on image features of the another packaging container.

\* \* \* \* \*